(12) United States Patent
Esfahani et al.

(10) Patent No.: US 10,842,005 B2
(45) Date of Patent: Nov. 17, 2020

(54) ASSEMBLY AND METHOD FOR CONTROLLING ELECTRONIC EQUIPMENT

(71) Applicant: PLEJD AB, Gothenburg (SE)

(72) Inventors: Babak Esfahani, Gothenburg (SE); Gustav Josefsson, Gothenburg (SE)

(73) Assignee: PLEJD AB, Gothenburg (SE)

( * ) Notice: Subject to any disclaimer, the term of this patent is extended or adjusted under 35 U.S.C. 154(b) by 0 days.

(21) Appl. No.: 16/339,107

(22) PCT Filed: Oct. 16, 2017

(86) PCT No.: PCT/SE2017/051016
§ 371 (c)(1),
(2) Date: Apr. 3, 2019

(87) PCT Pub. No.: WO2018/074969
PCT Pub. Date: Apr. 26, 2018

(65) Prior Publication Data
US 2019/0239322 A1    Aug. 1, 2019

(30) Foreign Application Priority Data
Oct. 17, 2016   (SE) ...................................... 1651352

(51) Int. Cl.
| F21V 23/02 | (2006.01) |
| H05B 47/19 | (2020.01) |
| H02G 3/12 | (2006.01) |
| H01H 19/14 | (2006.01) |
| H01H 9/02 | (2006.01) |

(Continued)

(52) U.S. Cl.
CPC ............. H05B 47/19 (2020.01); H01H 19/14 (2013.01); H02G 3/12 (2013.01); *F21V 23/001* (2013.01); *F21V 23/003* (2013.01); *F21V 23/007* (2013.01); *H01H 9/0271* (2013.01); *H01H 2300/03* (2013.01); *H04W 4/80* (2018.02)

(58) Field of Classification Search
CPC ..... F21V 23/001; F21V 23/003; F21V 23/007
USPC .................................... 361/728, 601, 679.01
See application file for complete search history.

(56) References Cited

U.S. PATENT DOCUMENTS

| 8,467,734 B2 * | 6/2013 | Schubert ................ H01R 13/66 |
| | | 455/66.1 |
| 2009/0302782 A1 * | 12/2009 | Smith ................ H05B 37/0245 |
| | | 315/297 |
| 2011/0062888 A1 | 3/2011 | Bondy et al. |

(Continued)

FOREIGN PATENT DOCUMENTS

| AT | 512855 A1 | 11/2013 |
| DE | 29504491 U1 | 6/1995 |

(Continued)

OTHER PUBLICATIONS

PCT International Search Report and Written Opinion dated Dec. 12, 2017 for International Application No. PCT/SE2017/051016, 13 pages.

(Continued)

*Primary Examiner* — Thuy Vinh Tran
(74) *Attorney, Agent, or Firm* — RMCK Law Group, PLC (57) ABSTRACT

The present invention generally relates to an assembly for controlling electronic equipment, specifically improving electrical installation and lighting control. The invention also relates to a method for forming such an assembly.

17 Claims, 7 Drawing Sheets

(51) Int. Cl.
*F21V 23/00* (2015.01)
*H04W 4/80* (2018.01)

(56) References Cited

U.S. PATENT DOCUMENTS

| | | | |
|---|---|---|---|
| 2011/0234420 A1* | 9/2011 | Cutler | H01H 9/181 340/815.45 |
| 2012/0182698 A1 | 7/2012 | Langels et al. | |
| 2014/0203939 A1 | 7/2014 | Harrington et al. | |
| 2016/0050779 A1* | 2/2016 | Kawamura | H02G 3/18 361/732 |
| 2016/0295658 A1 | 10/2016 | Chraibi et al. | |

FOREIGN PATENT DOCUMENTS

| | | |
|---|---|---|
| DE | 19832398 A1 | 1/2000 |
| DE | 102008060347 A1 | 6/2010 |
| EP | 2071600 A1 | 6/2009 |
| GB | 2533441 A | 6/2016 |
| WO | 2016154461 A1 | 9/2016 |

OTHER PUBLICATIONS

Extended European Search Report dated Mar. 16, 2020 for European Application No. 17861506.8, 9 pages.

\* cited by examiner

ASSEMBLY AND METHOD FOR CONTROLLING ELECTRONIC EQUIPMENT

CROSS-REFERENCE TO RELATED APPLICATIONS

This application is a 371 U.S. National Stage of International Application No. PCT/SE2017/051016, filed Oct. 16, 2017, which claims priority to Swedish Patent Application No. 1651352-5, filed Oct. 17, 2016. The disclosures of each of the above applications are incorporated herein by reference in their entirety.

TECHNICAL FIELD

The present invention generally relates to an assembly for controlling electronic equipment, specifically improving electrical installation and lighting control. The invention also relates to a method for forming such an assembly.

BACKGROUND OF THE INVENTION

In using a conventional lighting system, for example in a residential home, each luminaire, such as for example arranged in a ceiling of a room, is controlled using an individually provided light control unit, such as a push-on/push-off switch button. Recently, there has been a desire to improve the overall control of lighting and possibly further electrical equipment, forming the so-called "intelligent home", where intelligent lighting systems combine light emitting diodes (LEDs), embedded sensors and controls, and low-cost pervasive networking to create an integrated illumination system which is highly responsive to its environment. Benefits of some or all such systems may include, but are not limited to, a much higher quality of light tailored specifically to user needs and significant energy savings, compared to legacy lighting system technologies.

An example of such an intelligent lighting system is disclosed in U.S.20140203939, disclosing a smart LED bulb including means for enabling the bulb to be turned ON, OFF, or dimmed without the use of a wall switch. Such means may include circuitry responsive to rotating the LED portion of the bulb, circuitry responsive to touching or tapping on the bulb, or a Bluetooth or Wi-Fi interconnection enabling the bulb to be controlled using a smartphone or other device executing a bulb-control application. A plurality of smart LED light bulbs may form a smart LED bulb system.

Even though U.S.20140203939 provides an interesting approach to lighting control, the necessity to use an external "new" device, such as a smartphone, will make the control inflexible when e.g. a household includes more than a single person. In addition, since U.S.20140203939 completely relies on retrofitting of all light bulbs within the household, a plurality of differently types of bulbs (intensity, size, etc.) must be provided to be able to handle the typical lighting desires that are present in e.g. different households.

Thus, it would be desirable to introduce a different approach to controlling electrical equipment, such as light sources/luminaires within e.g. a household, removing the explicit necessity of changing all light sources within the household. It would also be advantageous to possibly allow for an improved handling of driving different types of light sources used within the household, such as for example allowing control of different types of LED based luminaires, conventional incandescent lighting, etc.

SUMMARY OF THE INVENTION

According to an aspect of the invention, the above is at least partly met by a modular assembly for controlling a thereto-connected first electrical equipment, the assembly adapted to be installed in an electrical junction box, wherein the assembly comprises a first base module comprising a housing, a control unit arranged within the housing, and a connection block adapted to electrically connect the electrical equipment with the control unit, and a first control module adapted to at least partly extending outside of the electrical junction box and further comprising a control member adapted to generate an electrical control signal, wherein each of the first base module and the first control module comprises a first interface to mechanically interconnect the first base module and the first control module, each of the first base module and the first control module comprises a second interface to electrically interconnect the first control module to the first base module, the first control module further comprises a frame portion to mechanically secure the assembly to the electrical junction box, the first base module comprises a wireless transceiver adapted for wireless communication with a corresponding second base module arranged remotely from the first base module, the control unit is adapted to control the first electrical equipment and a second electrical equipment connected to the second base module based on the electrical control signal, the first base module is selected to generate a drive signal matching a driving preference for the electrical equipment, and the type of the base module is selected based on a type of electrical equipment to be controlled.

By means of the present disclosure, a modular assembly is presented, where a control module provided with a desired control member, such as e.g. one of a rotary knob and a switch, is interconnected with base module, where the base module selected to match a driving preference for the electrical equipment. Accordingly, different type of electrical equipment, such as different types of light sources or luminaires applying different types of electrical control, may easily be operated in a desired manner, using the appropriate control member.

The interconnection between the base module and the control module is provided by means of a first and a second interface, where the first interface allows for mechanically securing base module to the control module, and the second interface is provided for electrically connecting the base module and the control module, such that an electrical control signal generated by the control module is safely provided to the base module.

The first interface may in one embodiment of the disclosure comprise a first and a second protruding hook member to mechanically engage with corresponding groves provided at and forming part of the first interface of the base module. In addition, the second interface electrically interconnecting the control module to the base module may comprise a plurality of spring-loaded pins, such as for example four pins. Typically, the second interface is solely used for "low voltage" signals. The assembly is also provided with a frame portion to allow for the assembly to be mechanically secured to an electrical junction box, for example using a set of screws. It should however be understood that the expression "mechanically secure the assembly to the electrical junction box" (using the frame portion) also includes where the frame member e.g. is secured to a wall/ceiling where the electrical junction box is arranged, indirectly securing the assembly to the electrical junction box.

A connection block of the base module is also preferably adapted to be connected to an electrical power supply, such as the mains. In addition, a cover member is preferably adapted to be fitted to the frame portion of the control module.

The modular assembly is, as stated above, adapted to be installed within an electrical junction box, for example in a wall. The proposed solution, where the base module and the control module are completely secured with each other allow for an improved installation of the assembly as compared to a situation where e.g. a "dimmer or driver module" is allowed to be unsecured and loosely placed within the electrical junction box. Furthermore, by providing the assembly as a single entity (once the modules are secured to each other), the time it take e.g. an electrician to install the assembly may be reduce, as no additional electrical wires need to be manually placed between such a "loosely" placed dimmer or driver module and the switch, rather, the electrician may install the single entity assembly as he/she has always done, such as e.g. when installing a (normal) rotary dimmer.

In addition to the above, the base module is provided with a wireless transceiver, such as e.g. a Bluetooth or Wi-Fi transceiver, adapted for wireless communication with a corresponding second base module arranged remotely from the first base module. Thus, once e.g. the control member provided with the first control module is manually manipulated by a user, such as a person within the household, both the first and the second electrical equipment may be adjusted in a similar manner, even though the (second) electrical equipment electrically connected to the second base module may be of a different type as compared to the (first) electrical equipment connected to the first base module.

In the discussion above, the control member provided with the control module has been exemplified as including e.g. a rotary knob or a switch (also including electronic switches implemented using e.g. a touch screen member) to be manually operated by the user for generating the control signal. It should however be understood that the control member also alternatively may comprises at least one of a motion detector and a camera for automatic generation of the control signal. It may of course be possible to adapt the control module such that it may receive manual user interaction/control as well as in itself automatically generate the electrical control signal (i.e. a combination of both manual and automatic generation of the control signal).

It may in a possible embodiment of the present disclosure be possible to equip the control module with control circuitry for performing some form of computation and control. For example, the control circuitry may be used for operating the touch screen member, the motion detector, the camera or a light sensing functionality. In some embodiments it may also be useful to make use of the control circuitry also in relation to a "purely" manual control member (such as e.g. the rotary knob or the switch), i.e. for improving e.g. adjustment of a light intensity level (dimming) in case the control member is adapted for such control, e.g. improving an accuracy of the intensity level when the user is manipulating the rotary knob, filtering of user input, etc.

The (first) modular assembly is preferably arranged as a component of a control system, further comprising at least an additional (second) modular assembly. It may of course be possible to allow further modular assemblies to form part of the control system. In line with the discussion above, also the second assembly (or any further assembly) may be adapted to generate a control signal that is to be received by the first assembly. Accordingly, the second assembly may control electrical equipment connected to the first assembly, and vice versa.

According to another aspect of the present invention there is provided a method for forming an assembly for controlling a first electrical equipment, the assembly adapted to be installed in an electrical junction box, wherein the assembly comprises a first base module comprising a housing, a control unit arranged within the housing, a wireless transceiver adapted for wireless communication, and a connection block adapted to electrically connect the electrical equipment with the control unit, and a first control module adapted to at least partly extending outside of the electrical junction box and further comprising a control member adapted to generate an electrical control signal, wherein the method comprises selecting a type of the first control module for providing corresponding type of control functionality, selecting a type of the first base module based on the electrical equipment to be controlled and matching the selected control functionality, mechanically interconnecting the first base module and the first control module using a first interface, electrically interconnecting the first base module and the first control module using a second interface, mechanically securing a frame portion comprised with the first control module to the electrical junction box, and controlling the first electrical equipment and a second electrical equipment connected to a corresponding second base module arranged remotely from the first base module based on the electrical control signal. This aspect of the invention provides similar advantages as discussed above in relation to the previous aspect of the invention.

As stated above, the control module is preferably selected from a plurality of different types of control module for automatic or manual generation of the control signal and the type of the base module is preferably selected based on a type of electrical equipment to be controlled.

A software executed by the control unit for operation in accordance to the invention may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1:
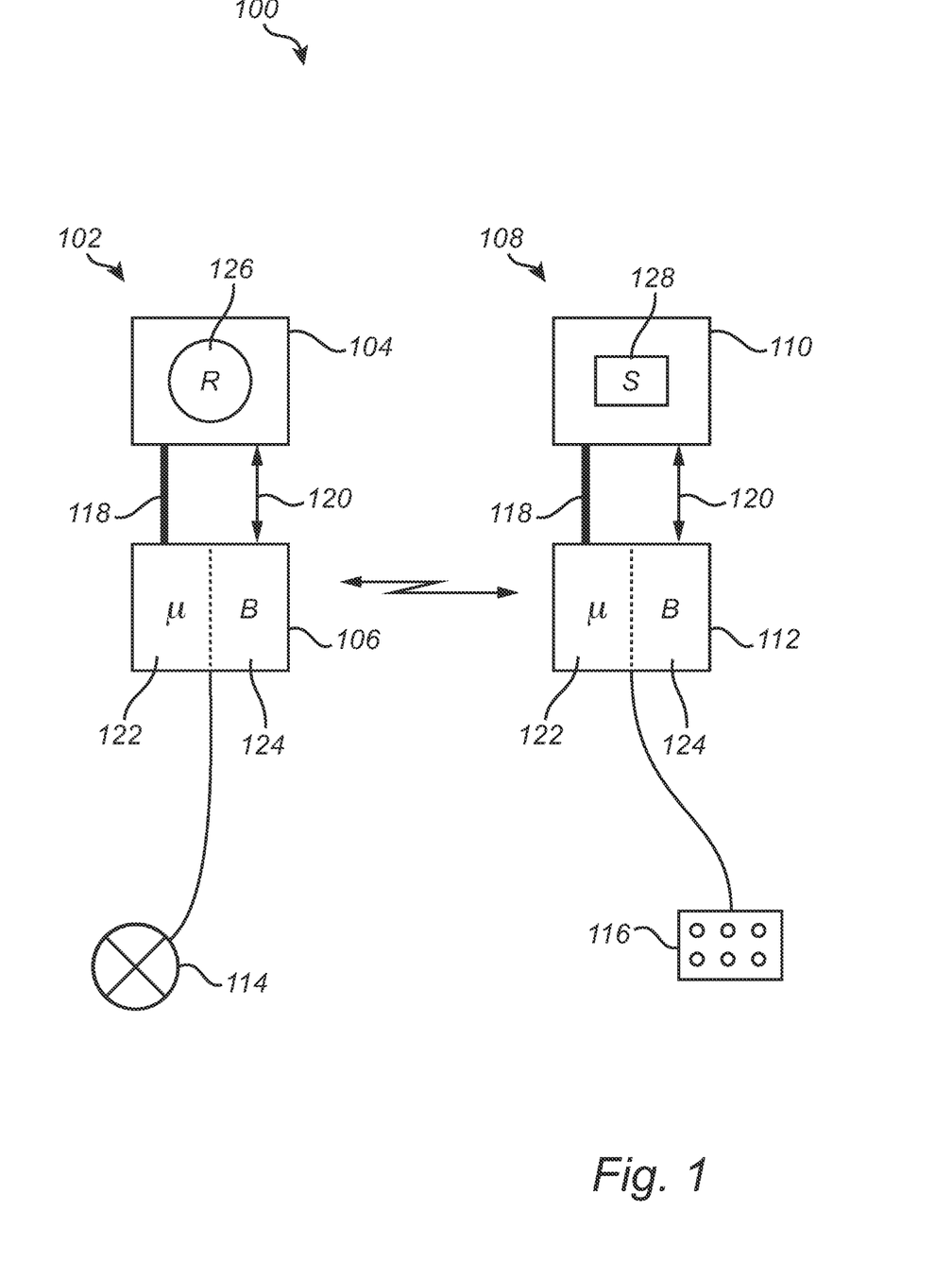
FIG. 1 conceptually illustrates a lighting control system according to a currently preferred embodiment of the present disclosure.

Referring now to the drawings and to FIG. 1 in particular, there is depicted a lighting system 100 according to a possible embodiment of the invention. The lighting system 100 comprises a first modular assembly 102 including a first base module 104 and a first control module 106. The lighting system 100 also comprises a second modular assembly 108 including a second base module 110 and a second control module 112. Each of the first 102 and the second 108 modular assemblies are electrically connected to a first 114 and a second 116 luminaire, respectively. The first luminaire 114 comprised a halogen based light source 118 and the second luminaire 116 comprises a plurality of light emitting diodes (LEDs) 120. Accordingly, the first 114 and the second 116 luminaries have different driving preference, typically to be electrically controlled using different voltage and/or current levels.

The halogen based first luminaire 114 may for example be configured to receive an unregulated electrical mains AC signal, e.g. rated at 230 or 110 V. The LED based second luminaire 118 may on the other hand need a regulated DC drive signal at e.g. 5V, 12 V, 18 V, etc.

As will be further elaborated below, each of the first 106 and the second 112 base modules are mechanically and electrically interconnected to its corresponding first 104 and second 110 control module using a first 118 and a second 120 interface. The first interface 118 is provided for mechanically securing the base module to the respective control module. The second interface 120 is provided for electrically connecting the base module to the respective control module.

In addition, each of the base modules 106, 112 is equipped with a control unit 122 and a wireless transceiver 124. The control unit 122 may include a microprocessor, microcontroller, programmable digital signal processor or another programmable device. The control unit 122 may also, or instead, each include an application specific integrated circuit, a programmable gate array or programmable array logic, a programmable logic device, or a digital signal processor. Where the control unit 122 includes a programmable device such as the microprocessor, microcontroller or programmable digital signal processor mentioned above, the processor may further include computer executable code that controls operation of the programmable device. The wireless transceiver 124 is preferably configured for Bluetooth communication. However, other wireless implementations are possible, such as using WLAN, CDMA, GSM, GPRS, 3G mobile communications, 4G mobile communications, Zig-Bee, infrared, or similar. The wireless communication is preferably performed within a radio spectrum comprising frequency bands within the 2.4 GHz range, possibly also or instead at the 5 GHz radio frequency spectrum.

Furthermore, each of the first 104 and second 110 control modules is provided with a control member, respectively. In the illustrated embodiment, the first control module 104 is equipped with a rotary knob 126, whereas the second control module 110 is equipped with a momentary switch 128.

During operation of the lighting system 100, the rotary knob 126 arranged at the first control module 104 of the first control assembly 102 may be manually rotated/adjusted/repositioned by a user of the lighting system 100. Once the rotary knob 126 is repositioned, an electrical control signal being indicative of a level of repositioning is generated by the first control module 104 and transmitted over the second interface 120 from the first control module 104 to the first base module 106. The electronic control signal is received by the control unit 122 of the first base module 106. The control unit 122 will provide a drive signal to the thereto-connected first luminaire 114. The control unit 122 will also control the transceiver 124 of the first base module 106 to transmit a further control signal to the transceiver 124 of the second base module 112 comprised with the second assembly 108.

Once received at the transceiver 124 of the second base module 112, the further control signal will be provided to the control unit 122 of the second base module 112, which in turn will provide a drive signal to the thereto-connected second luminaire 116. Preferably, the first 114 and the second 116 luminaire are controlled in a synchronous manner, i.e. such that they e.g. are turned on simultaneously, dimmed (controlled intensity) to corresponding levels, etc.

For further improving the operation of the lighting system 100, it may also be possible to configure the control unit 122 for identifying the type of control module being connected to the base module. Accordingly, in a step following the mechanical/electrical interconnection between the base module and the control module, the control unit 122 may request the control module to present information being indicative of its type. Such information is typically transmitted from the control module to the base module. In a possible implementation, it may also be possible to configure the control module to "in itself" provide the base module with information indicative of its type.

In line with the present disclosure, also the opposite is possible, e.g. in case the user would adjust the setting of the control member provided at the second control module 110 (i.e. the momentary switch 128). That is, if the momentary switch 128 is manipulated, the second luminaire 116 electrically connected to the second assembly 108 will be adjusted and a still further control signal will be transmitted from the transceiver 124 of the second base module 112 to the transceiver 124 of the first base module 106 for controlling the first luminaire 114.

In the illustration provided in FIG. 1 there is illustrated only two assemblies, i.e. the first 102 and the second 108 assembly in wireless communication with each other. It would of course be possible and within the scope of the present disclosure to include also a third, fourth, and so on, assembly, each connected to a separate (or groups of) luminaires, where the assemblies may be used to "control each other". It may also be possible to set-up specific groups, possibly limiting the controllability for some assemblies (i.e. some of the assemblies may be arranged as "master" assemblies whereas some assemblies may only be "slave" assemblies).

Figure 2A:
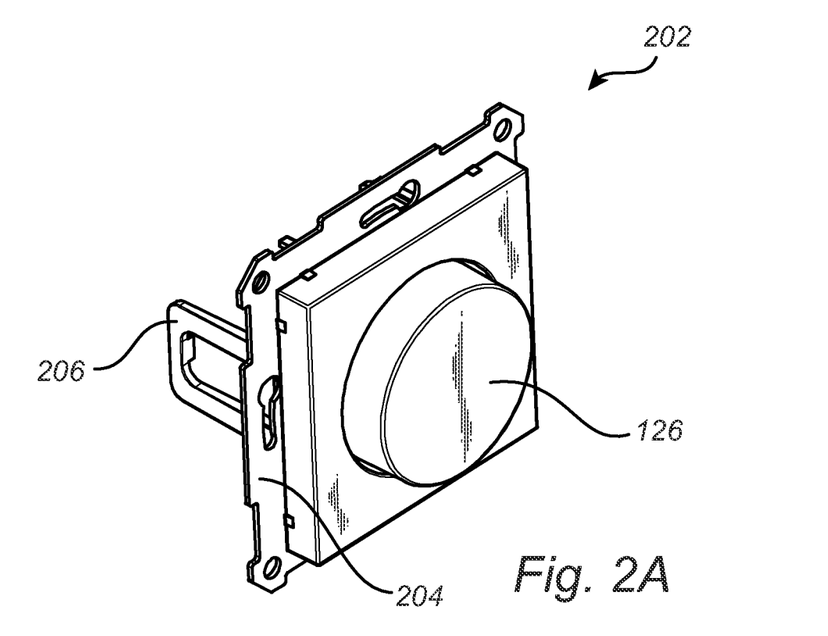
FIGS. 2A and 2B illustrate a possible implementation of a control module including a control member.
Figure 2B:
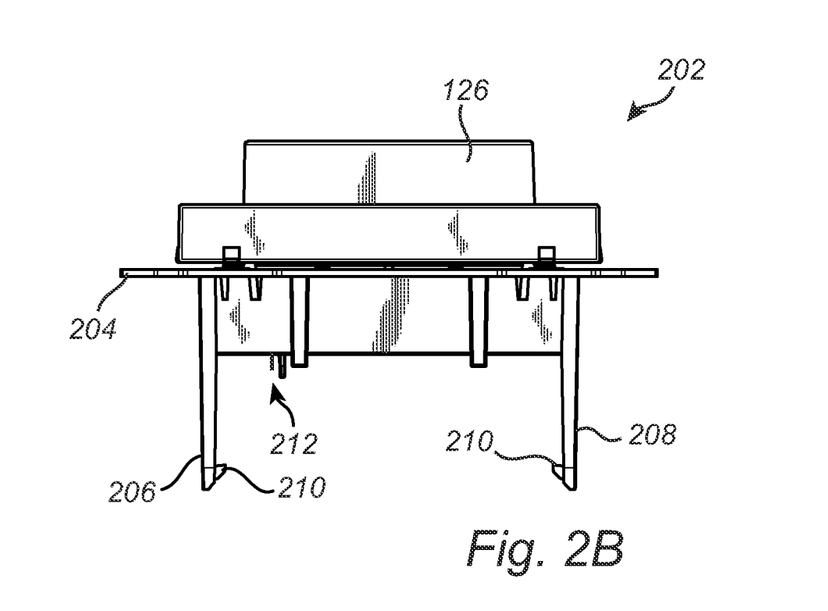

Turning now to FIGS. 2A and 2B, where it is illustrated two separate views of a possible exemplary implementation of a control module 202. The control module 202 comprises the rotary knob 126 as the dedicated control member. The control module 202 further comprises a frame portion 204 allowing the assembly to be mechanically secured to the electrical junction box (as will be further elaborated below in relation to FIG. 5B).

Furthermore, in the illustrated embodiment, the first interface for mechanically interconnecting the control module 202 to the base module is implemented by means of a pair of protruding hook members 206, 208. The hook members 206, 208 each comprises an angled end portion 210 to fit with a recess provided with the base module (as will be elaborated in relation to FIGS. 3A, 3B, 4A and 4B). The hook members 206, 208 are preferably formed from a slightly flexible material (such as plastic), for allowing a distance between the end portions 210 to be slightly increase when interconnecting the control module 202 to the base module, and then to flex back once in place. In FIG. 2B, it is also partly shown a control module electrical interface part 212 of the second interface 120.

Figure 3A:
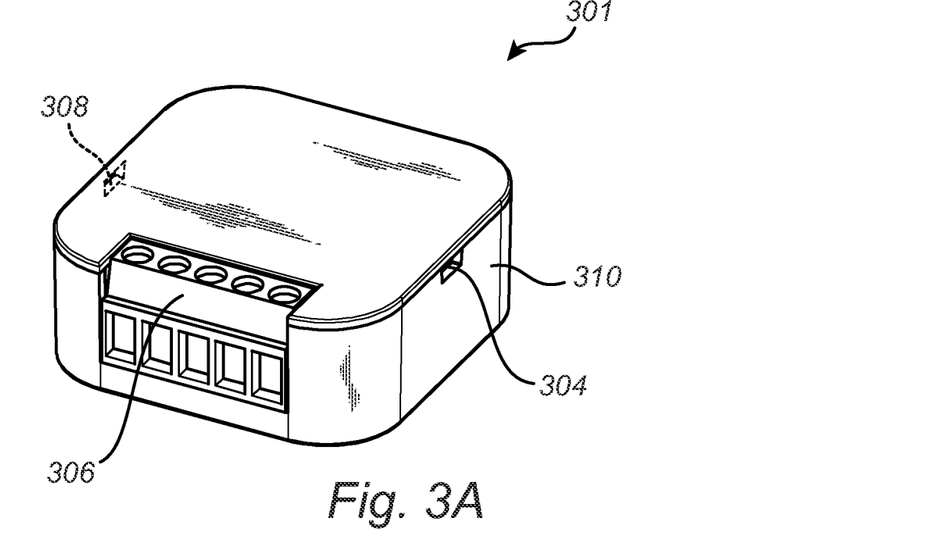
FIGS. 3A and 3B illustrate a possible implementation of a base module including a control member.
Figure 3B:
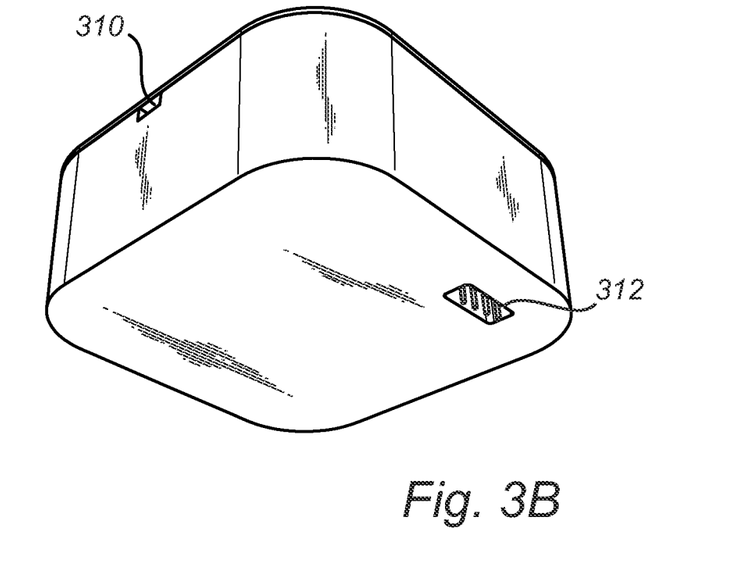

In FIGS. 3A and 3B, there is shown two separate views of a possible exemplary implementation of a base module 302. The base module comprises a housing 304 and a connection block 306. The connection block 306 is provided for electrically connecting the luminaire (e.g. one of luminaires 114 and 116) and to an electrical power supply, such as the mains. As mentioned above, the base module 302 is further provided with a pair of recesses 308, 310 for connecting the end portions 210 of the hook members 206, 208. In addition, the base module is provided with a base module electrical interface part 312 of the second interface 120.

Figure 4A:
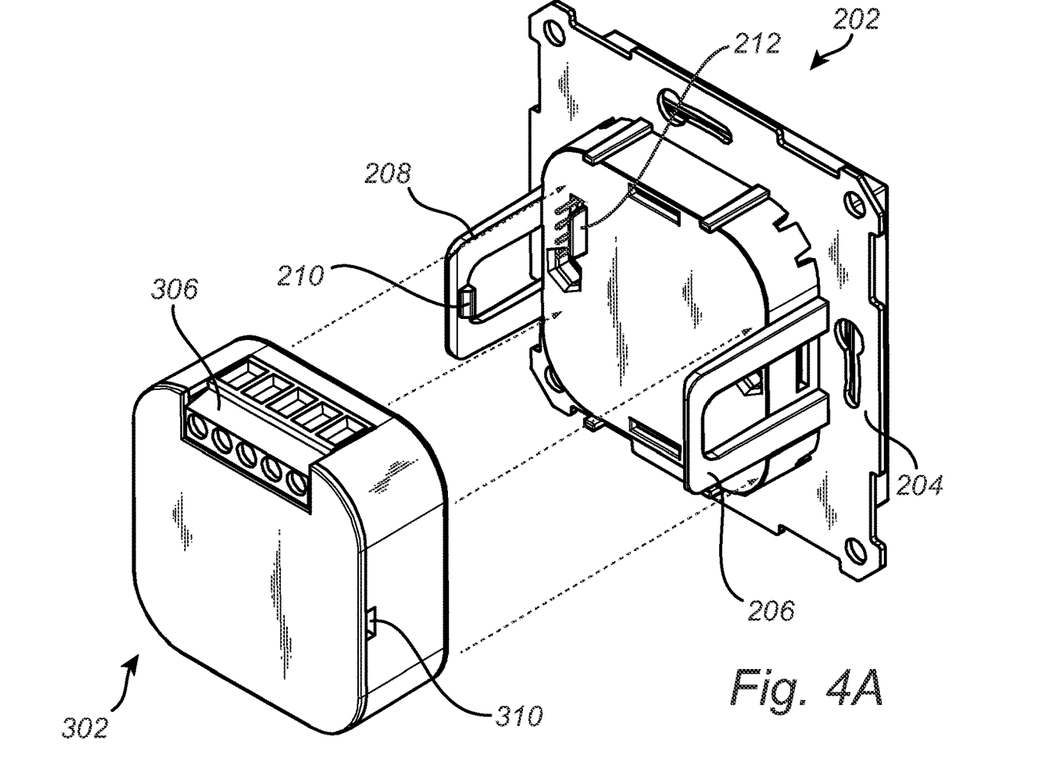
FIGS. 4A and 4B show mechanical/electrical assembly of the base module with the control module.
Figure 4B:
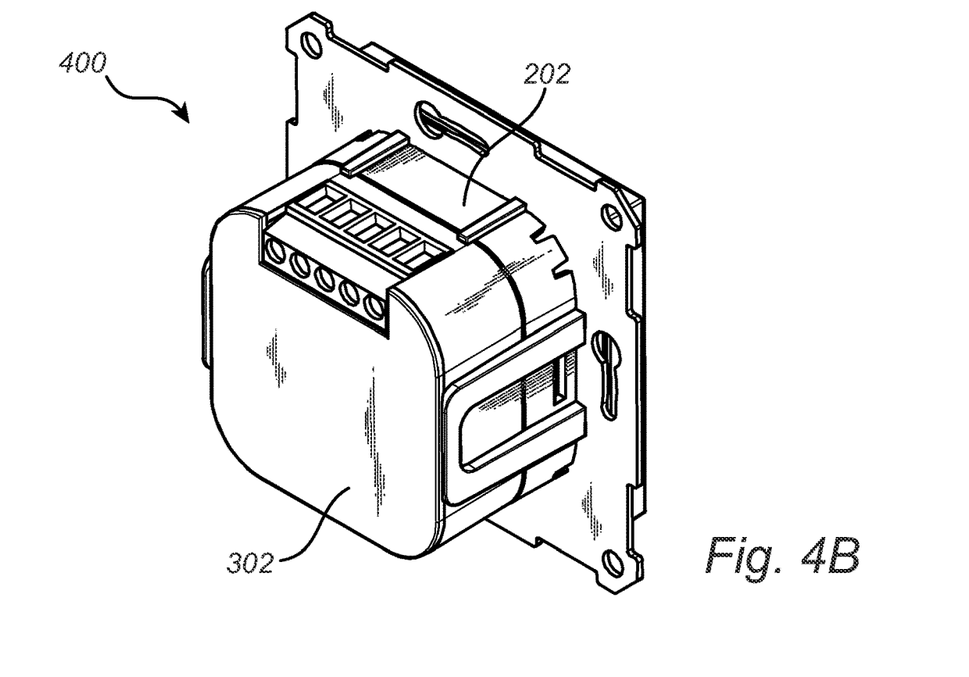

Furthermore, as is shown in FIGS. 4A and 4B, the base module 302 is to be mechanically and electrically secured to the control module 202. The base module 302 and the control module 202 are "clicked together". That is, the hook members 206, 208 are flexed apart such that the base module 302 and the control module 202 are aligned with each other, allowing the end portions 210 to connect to the respective recesses 308, 310, thereby forming the first interface 118. In the final part of the mechanical connection phase, the control module electrical interface part 212 is connected to the base module electrical interface part 312, thereby forming the second interface 120. An assembly 400 has thereby been provided where the base module 302 is mechanically and electrically connected to the control module 202.

Figure 5A:
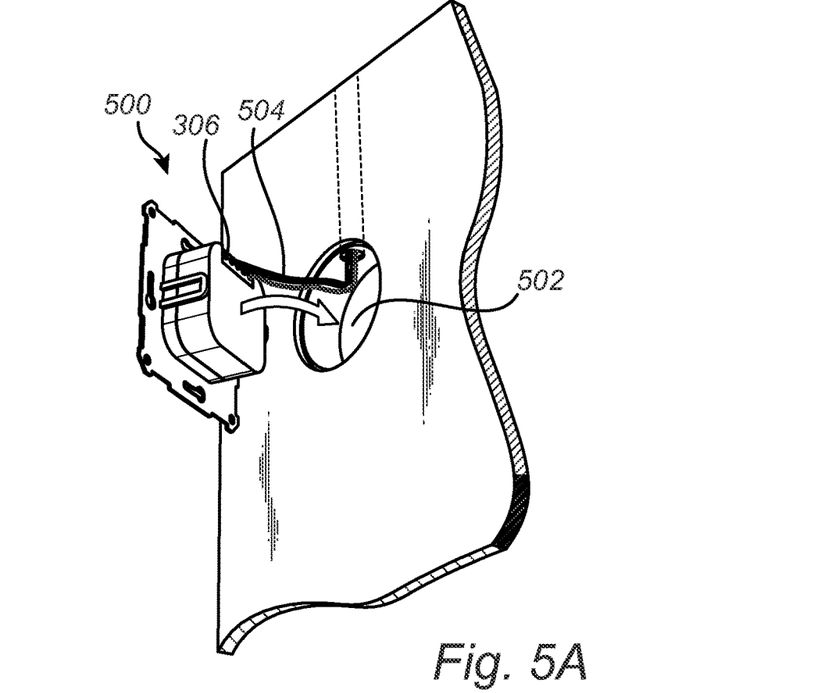
FIGS. 5A and 5B conceptually illustrate electrical installation of the modular assembly according to the present disclosure inside an electrical junction box in a wall.
Figure 5B:
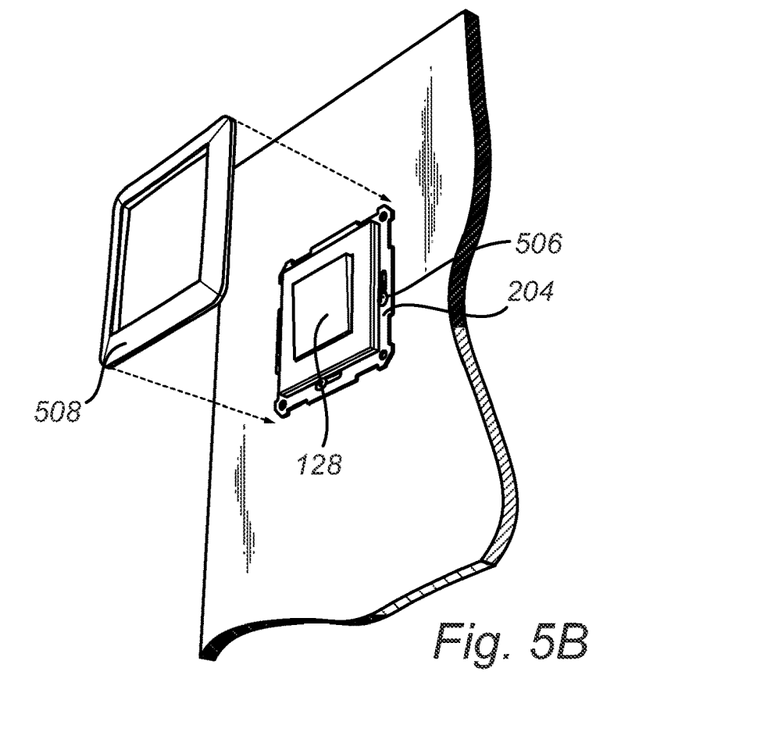

In FIGS. 5A and 5B, it is shown an alternative assembly 500, comprising the momentary switch 128 as the control member for manual control of e.g. one or both of the luminaires 114, 116, to be installed in an electrical junction box 502. A plurality of electrical cables 504 are adapted to be electrically connected to the connection block 306, typically providing an electrical connecting to both mains and one of the luminaires 114, 116.

Once the electrical cables have been secured to the connection block 306, the "back end" of the assembly is pushed into the electrical junction box 502. E.g. a pair of screws 506 may then together with the frame portion 204 mechanically secure the assembly 500 to the electrical junction box 502. A cover member 508 may then preferably be fitted to the frame portion 204 for covering the frame portion 204.

Figure 6:
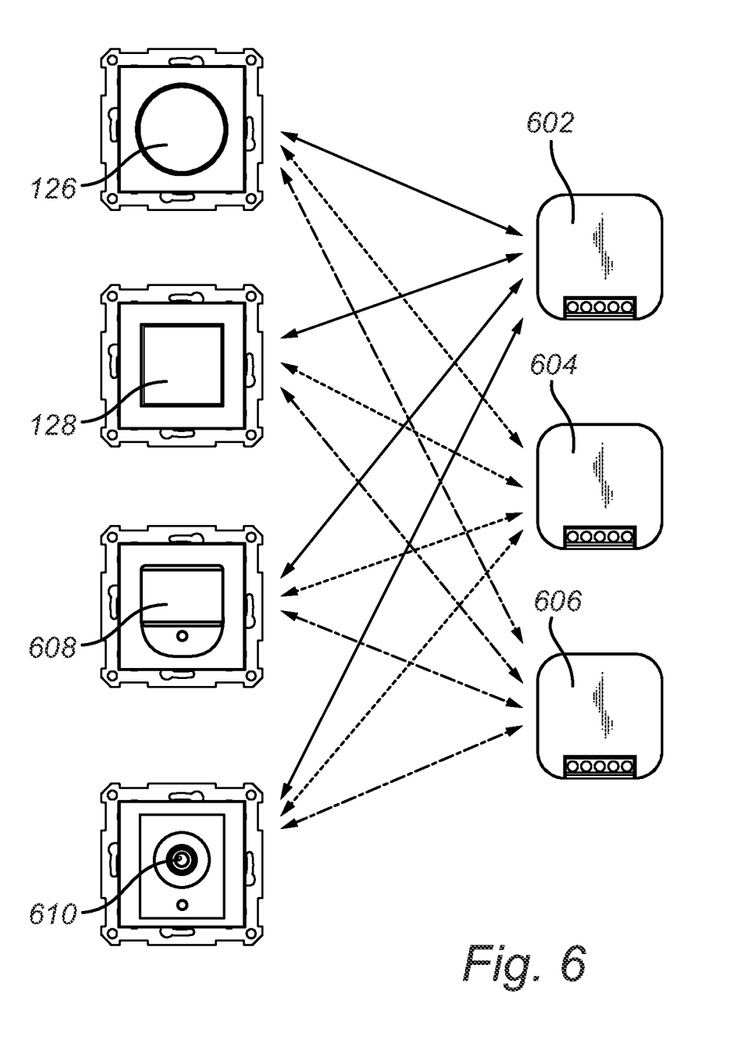
FIG. 6 exemplifies the combination of different types of control modules with different types of base modules.
Figure 7:
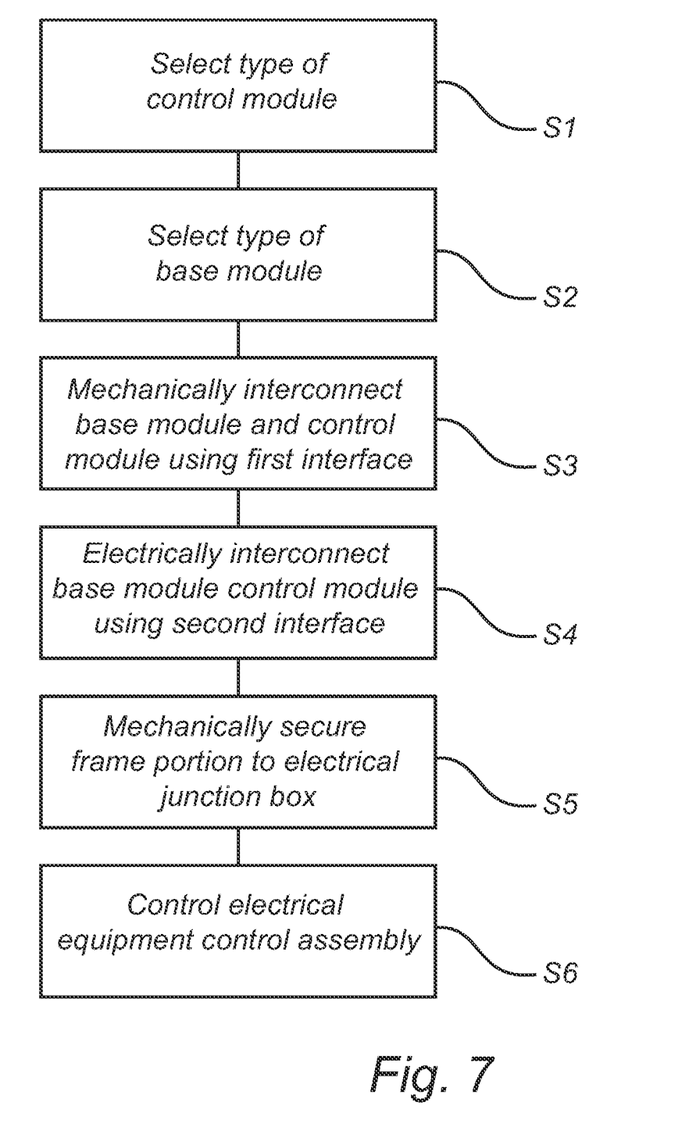
FIG. 7 shows a flow chart of a method according to an embodiment of the present disclosure.

Turning finally to FIGS. 6 and 7 where it is conceptually illustrated how to form an assembly for controlling the luminaires 114, 116. First, a type of control module is selected, S1, based on a desired user control functionality. For example and as is illustrated in FIG. 6, it may be possible to e.g. select a control module provided with the rotary knob 126 or the momentary switch 128. However, as has been discussed above it may also be possible to select a control module equipped with a light sensor 608 or a camera 610 for automatic generation of the control signal. It may of course also be possible to include a light sensor (for measuring ambient light), etc.

As a further step, a type of base module is to be selected, S2, where the base module may be adapted to function as a base module 504 with dimmer and driver functionality for an LED based luminaire, a base module with dimmer functionality 506 adapted to control a halogen or incandescent based luminaire, a base module 508 providing a 1-10 V driver signal, etc. Once the desired control module (with e.g. control member 126, 128, 608, 610) and a suitable base module (e.g. one of base modules 504, 506, 508), the base module and the control module are mechanically, S3 and electrically, S4, interconnected using the first and second interface, respectively. The combined assembly (e.g. assembly 102, 108, 400, 500) is electrically connected to suitable wiring (mains, luminaires, etc.) using electrical cables 504 and then mechanically secured, S5, to the electrical junction box 502 using the frame portion 204. Once installed, the assembly (e.g. assembly 102, 108, 400, 500) may be used for controlling e.g. the luminaires 114, 116.

In summary, the present invention relates to a modular assembly for controlling a thereto-connected first electrical equipment, the assembly adapted to be installed in an electrical junction box, wherein the assembly comprises a first base module comprising a housing, a control unit arranged within the housing, and a connection block adapted to electrically connect the electrical equipment with the control unit, and a first control module adapted to at least partly extending outside of the electrical junction box and further comprising a control member adapted to generate an electrical control signal, wherein each of the first base module and the first control module comprises a first interface to mechanically interconnect the first base module and the first control module, each of the first base module and the first control module comprises a second interface to electrically interconnect the first control module to the first base module, the first control module further comprises a frame portion to mechanically secure the assembly to the electrical junction box, the first base module comprises a wireless transceiver adapted for wireless communication with a corresponding second base module arranged remotely from the first base module, the control unit is adapted to control the first electrical equipment and a second electrical equipment connected to the second base module based on the electrical control signal, and the first base module is selected to generate a drive signal matching a driving preference for the electrical equipment.

By means of the present disclosure, a modular assembly is provided where a control module provided with a desired control member, such as a rotary knob and a switch, is combined with base module selected to match a driving preference for the electrical equipment. Accordingly, different type of electrical equipment, such as different types of light sources or luminaires applying different types of electrical control, may easily be operated in a desired manner, using the appropriate control member.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures may show a sequence the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A modular assembly for controlling a thereto-connected first electrical equipment, the assembly adapted to be installed in an electrical junction box, wherein the assembly comprises:
a first base module comprising a housing, a control unit arranged within the housing, and a connection block adapted to electrically connect the first electrical equipment with the control unit, and
a first control module adapted to at least partly extend outside of the electrical junction box and comprising a control member adapted to generate a first electrical control signal,
wherein:
each of the first base module and the first control module comprises a first interface to mechanically interconnect the first base module and the first control module,
each of the first base module and the first control module comprises a second interface to electrically interconnect the first control module to the first base module,
the first control module further comprises a frame portion to mechanically secure the assembly to the electrical junction box,
the first base module further comprises a wireless transceiver adapted for wireless communication with a second base module arranged remotely from the first base module,
the control unit is adapted to control the first electrical equipment and a second electrical equipment connected to the second base module based on the first electrical control signal,
the control unit is adapted to control the first electrical equipment based on a second electrical control signal received from the second base module via the wireless transceiver,
the first base module is selected to generate a drive signal matching a driving preference for the first electrical equipment, and
the type of the first base module is selected based on a type of the first electrical equipment to be controlled.

2. The assembly according to claim 1, wherein the second interface further forms part of an electrical connection between the control member at the first control module and the control unit at the first base module.

3. The assembly according to claim 1, wherein the first base module further comprises driver circuitry adapted to generate the drive signal for driving the first electrical equipment.

4. The assembly according to claim 3, wherein the first electrical equipment comprises a light source, the control member is configured to generate a varying control signal, and the control unit is further adapted to adjust the drive signal for controlling a light output from the light source.

5. The assembly according to claim 3, wherein the driver circuitry is further adapted to generate a varying voltage signal between 1 - 10 V.

6. The assembly according to claim 1, wherein the first control module further comprises processing circuitry adapted to receive an input signal from the control member and to generate the first control signal.

7. The assembly according to claim 1, wherein the control member comprises at least one of a rotary knob and a switch to be manually operated by a user for generating the first control signal.

8. The assembly according to claim 1, wherein the control member comprises at least one of a motion detector and a camera for automatic generation of the first control signal.

9. The assembly according to claim 1, wherein the first base module is further adapted to be connected to an electrical power supply.

10. The assembly according to claim 1, wherein the transceiver is configured for Bluetooth communication.

11. The assembly according to claim 1, wherein the first interface of the first control module includes a first and a second protruding hook member to mechanically engage with corresponding groves provided at and forming part of the first interface of the first base module.

12. The assembly according to claim 1, wherein the second interface electrically interconnecting the first control module to the first base module comprises a plurality of spring loaded pins.

13. The assembly according to claim 1, further comprises a cover member adapted to be fitted to the frame portion of the first control module.

14. A control system, comprising:
the modular assembly according to claim 1;

the first electrical equipment connected to the modular assembly;
a second assembly to which the second electrical equipment is connected.

15. The control system according to claim 14, wherein the second electrical control signal is generated at the second assembly and is wirelessly transmitted to the modular assembly for controlling the first electrical equipment.

16. A method for forming an assembly, which is adapted to be installed in an electrical junction box for controlling a first electrical equipment, comprising:
selecting a type of a control module for providing a corresponding type of control functionality;
selecting a type of a first base module based on the first electrical equipment to be controlled and matching the selected control functionality, wherein the type of the first base module is selected based on a type of the first electrical equipment to be controlled;
mechanically interconnecting the first base module and the control module using a first interface;
electrically interconnecting the first base module and the control module using a second interface; and
mechanically securing a frame portion comprised in the control module to the electrical junction box,
wherein:
the first base module comprises a housing, a control unit arranged within the housing, a wireless transceiver adapted for wireless communication, and a connection block adapted to electrically connect the first electrical equipment with the control unit,
the control module adapted to at least partly extend outside of the electrical junction box and comprising a control member adapted to generate a first electrical control signal,
the control unit is adapted to control the first electrical equipment and a second electrical equipment connected to a second base module based on the first electrical control signal, and
the control unit is adapted to control the first electrical equipment based on a second electrical control signal received from the second base module via the wireless transceiver.

17. The method according to claim 16, wherein the control module is selected from a plurality of different types of control modules for automatic or manual generation of the control signal.

* * * * *